(12) United States Patent
Shiu et al.

(10) Patent No.: US 7,869,116 B2
(45) Date of Patent: Jan. 11, 2011

(54) DISPLAY DEVICE FOR IMPROVING IMAGE CONTRAST

(75) Inventors: Jyh-Wen Shiu, Hsinchu (TW); Wei-Yuan Cheng, Taipei (TW); Pei-Ju Su, Hsinchu (TW); Kuo-Lung Lo, Taipei (TW); Yu-Hsiang Tsai, Changhua (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/467,074

(22) Filed: May 15, 2009

(65) Prior Publication Data

US 2010/0149621 A1  Jun. 17, 2010

Related U.S. Application Data

(60) Provisional application No. 61/138,095, filed on Dec. 16, 2008.

(51) Int. Cl.
*G02B 26/00* (2006.01)
*G02F 1/29* (2006.01)

(52) U.S. Cl. .................. 359/290; 359/237; 359/318

(58) Field of Classification Search ......... 359/290–292, 359/295, 223–225, 243, 260–263, 298, 198, 359/301–303, 317–318, 237, 242
See application file for complete search history.

(56) References Cited

U.S. PATENT DOCUMENTS

2008/0297880 A1* 12/2008 Steckl et al. .............. 359/291
2009/0040591 A1*  2/2009 Cheng et al. ............. 359/290

* cited by examiner

*Primary Examiner*—Scott J Sugarman
*Assistant Examiner*—Dawayne A Pinkney (57) ABSTRACT

A light valve unit may include a first conductive layer and a second conductive layer disposed on opposite sides of each other with respect to a plurality of cells in which at least some of the cells include a first material and a second material. The first material may have a lower light transmissivity property than the second material and a position of the first material within a corresponding cell may be changeable responsive to application of an electric field between the first and second conductive layers. The second conductive layer may include at least two electrodes and a gap defined between the two electrodes. A portion of the light valve unit adjacent to the gap may be configured to have a transmissivity that is substantially less than transmissivity of a portion of the light valve unit adjacent to cells across which the electric field is applied, but greater than or equal to transmissivity of a portion of the light valve unit adjacent to cells across which the electric field is not applied.

20 Claims, 9 Drawing Sheets

```
┌─────────────────────────────────────┐
│   Providing a first conductive layer and a   │
│  second conductive layer disposed on opposite │
│   sides of each other with respect to a plurality │
│   of cells, at least some of the cells including a │
│   first material and a second material, the first │
│   material having a lower light transmissivity │
│   property than the second material, a position │      ⎯ 900
│   of the first material within a corresponding │
│        cell being changeable responsive to         │
│   application of an electric field between the │
│            first and second conductive layers          │
└─────────────────────────────────────┘
                    │
                    ▼
┌─────────────────────────────┐
│   Providing a gap between at least two   │      ⎯ 910
│  electrodes forming the second conductive │
│                       layer                      │
└─────────────────────────────┘
                    │
                    ▼
┌─────────────────────────────────────┐
│  Configuring a portion of the light valve unit │      ⎯ 920
│      adjacent to the gap to have a transmissivity      │
│  that is substantially less than transmissivity of │
│      a portion of the light valve unit adjacent to      │
│  cells across which the electric field is applied, │
│   but greater than transmissivity of a portion of │
│      the light valve unit adjacent to cells across      │
│         which the electric field is not applied         │
└─────────────────────────────────────┘
```

FIG. 9.

DISPLAY DEVICE FOR IMPROVING IMAGE CONTRAST

CROSS REFERENCE TO RELATED APPLICATION

This application claims the benefit of U.S. Provisional Application No. 61/138,095 filed Dec. 16, 2008, the content of which is incorporated herein in its entirety.

TECHNOLOGICAL FIELD

The present invention generally relates to a display with high display contrast characteristic, and more particularly, to features associated with an electrowetting light valve.

BACKGROUND

Electrowetting is an emerging technology for a variety of display applications, such as reflective displays, transmission displays and light shutters.

Figure 1A:
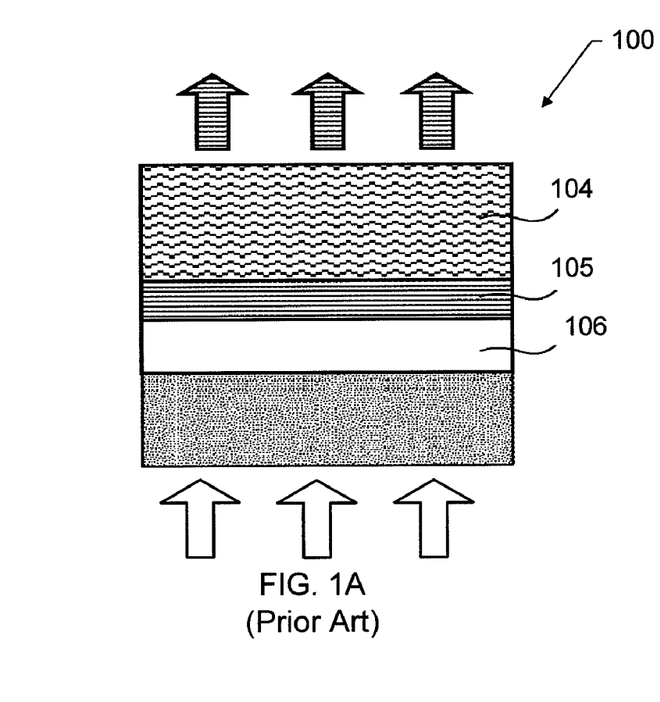
FIGS. 1A and 1B illustrate an exemplary operation and structure of an electrowetting light valve.
Figure 1B:
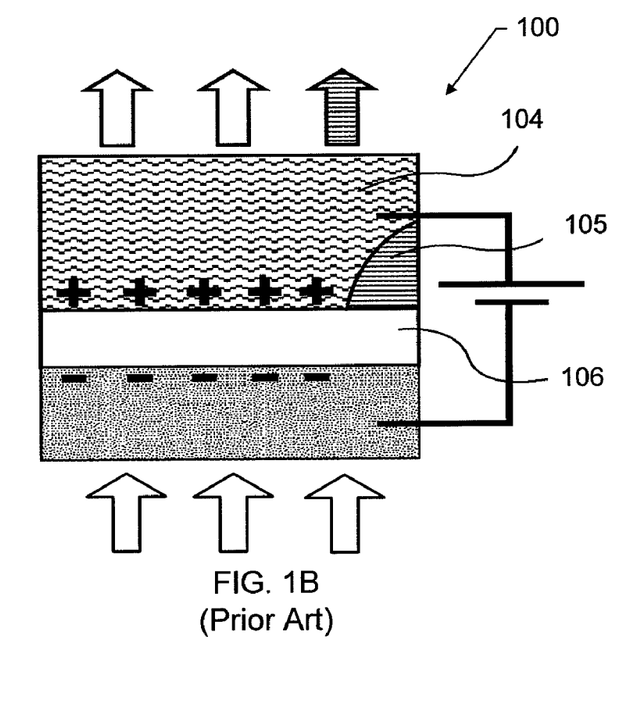

The general principle of electrowetting technology is shown in FIGS. 1A and 1B. Referring to FIG. 1A, when no electric filed is applied, a colored non-polar liquid 105 may naturally spread over an underlying layer 106. An electrowetting display unit 100 may show the color of the non-polar liquid 105 to a viewer, thereby limiting the ability of light to pass through the electrowetting display unit 100 as indicated by the filled in arrows of FIG. 1A. On the other hand, when an electric filed is applied as illustrated in FIG. 1B, due to the electrowetting effect, a conductive liquid 104 will approach the underlying layer 106 which causes a change in the shape of the colored non-polar liquid 105 or pushes aside the non-polar liquid 105, resulting in transmission of incidence light through the underlying layer 106 as indicated by the empty arrows in FIG. 1B replacing the formerly filled in arrows shown in FIG. 1A. Because the display brightness depends on the contraction of the colored non-polar liquid 105, it may be desirable to improve the display contrast by controlling the light transmission through the electrowetting display unit 100.

BRIEF SUMMARY

Examples of the present invention may provide a mechanism for providing improved display contrast with an electrowetting light valve unit. In this regard, for example, some embodiments of the present invention may provide for different mechanisms by which contrast changes between cells may be mitigated.

In an exemplary embodiment, a light valve unit is provided. The light valve unit may include a first conductive layer and a second conductive layer disposed on opposite sides of each other with respect to a plurality of cells disposed therebetween in which at least some of the cells include a first material and a second material. The first material may have a lower light transmissivity property than the second material and a position of the first material within a corresponding cell may be changeable responsive to application of an electric field between the first and second conductive layers. The second conductive layer may include at least two electrodes and a gap defined between the two electrodes. A portion of the light valve unit adjacent to the gap may be configured to have a transmissivity that is substantially less than transmissivity of a portion of the light valve unit adjacent to cells across which the electric field is applied, but greater than or equal to transmissivity of a portion of the light valve unit adjacent to cells across which the electric field is not applied.

In another exemplary embodiment, a display with high display contrast characteristics is provided that may include a display panel and a light valve unit in operable communication with the display panel. The light valve unit may include a first conductive layer and a second conductive layer disposed on opposite sides of each other with respect to a plurality of cells disposed therebetween in which at least some of the cells include a first material and a second material. The first material may have a lower light transmissivity property than the second material and a position of the first material within a corresponding cell may be changeable responsive to application of an electric field between the first and second conductive layers. The second conductive layer may include at least two electrodes and a gap defined between the two electrodes. A portion of the light valve unit adjacent to the gap may be configured to have a transmissivity that is substantially less than transmissivity of a portion of the light valve unit adjacent to cells across which the electric field is applied, but greater than or equal to transmissivity of a portion of the light valve unit adjacent to cells across which the electric field is not applied.

A method for providing a display with improved contrast is also provided. The method may include providing a first conductive layer and a second conductive layer disposed on opposite sides of each other with respect to a plurality of cells of a light valve unit in which at least some of the cells include a first material and a second material. The first material may have a lower light transmissivity property than the second material and a position of the first material within a corresponding cell may be changeable responsive to application of an electric field between the first and second conductive layers. The method may further include providing a gap between at least two electrodes forming the second conductive layer and configuring a portion of the light valve unit adjacent to the gap to have a transmissivity that is substantially less than transmissivity of a portion of the light valve unit adjacent to cells across which the electric field is applied, but greater than or equal to transmissivity of a portion of the light valve unit adjacent to cells across which the electric field is not applied.

BRIEF DESCRIPTION OF THE SEVERAL VIEWS OF THE DRAWINGS

The various objectives and advantages of various embodiments of the present invention can be fully understood by reading the following detailed description with reference made to the accompanying drawings, which are given by way of illustration only, and thus are not limiting, and wherein.

DETAILED DESCRIPTION

Reference will now be made in detail to the present embodiments of the invention, examples of which are illustrated in the accompanying drawings. Wherever possible, the same reference numbers will be used throughout the drawings to refer to the same or like parts. As used herein, the term "exemplary" is not provided to convey any qualitative assessment, but instead merely to convey an illustration of an example.

Figure 2:
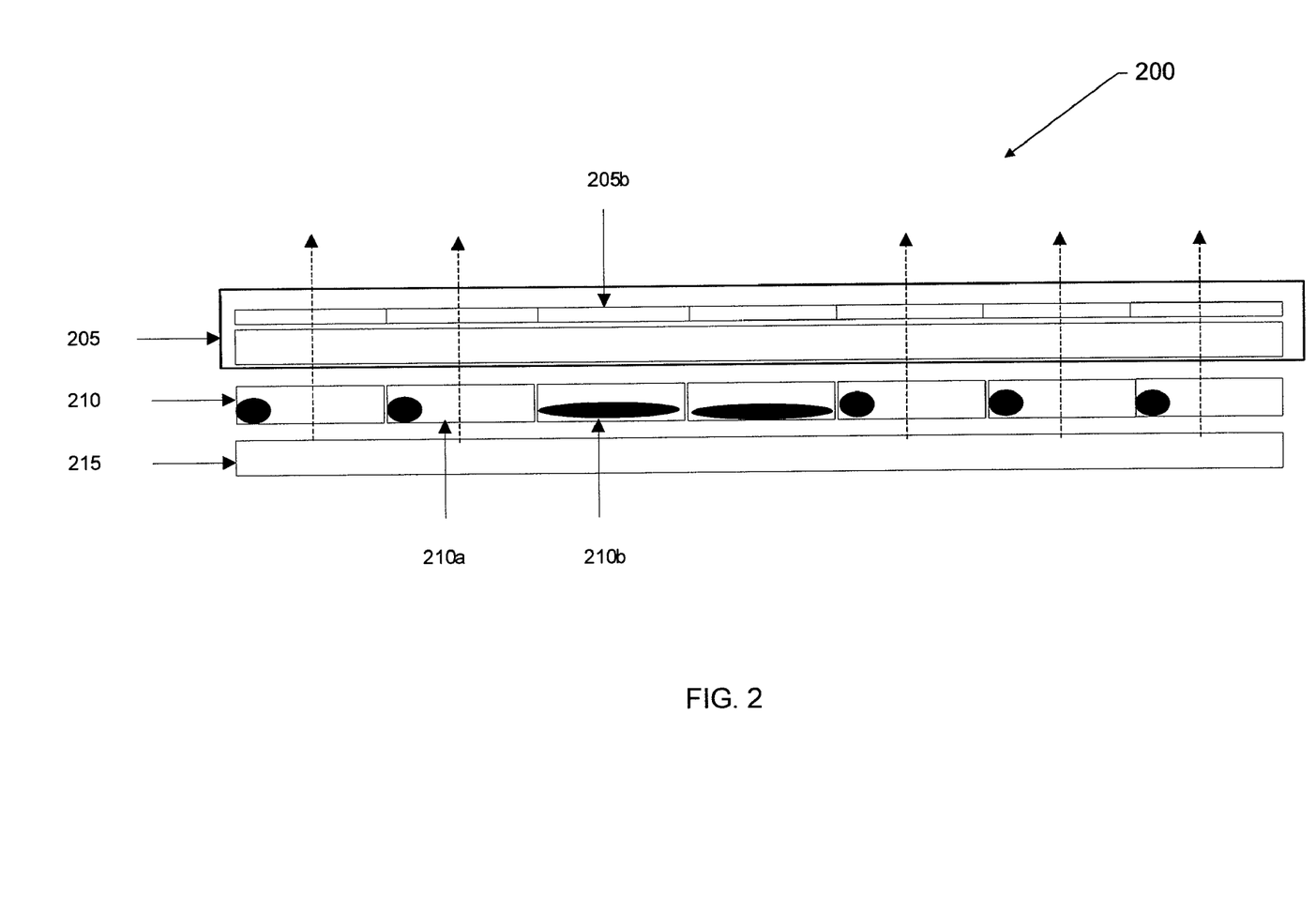
FIG. 2 illustrates a display light according to one exemplary embodiment of the present invention.

FIG. 2 illustrates a display unit 200 according to one exemplary embodiment of the present invention. As shown in FIG. 2, the display unit 200 comprises a display panel 205, a light valve unit 210 and a backlight unit 215. The light valve unit 210 added between the display panel 205 and the backlight unit 215 may comprise a plurality of cells (e.g., cells 210a and 210b). By switching states of materials in specified cells, the amount of backlight reflected or otherwise directed through the specified cells may be changed. For example, when the cell 210b is in an OFF state (e.g., with no electric field applied thereto), light transmitted through display area 205b associated with the cell 210b may be significantly reduced due to the expansion of a liquid (e.g., colored non-polar liquid 105) over substantially all of the cell 210b. The brightness of the display area 205b is dimmed. However, in response to an electric field being applied to a cell (e.g., cell 210a) the liquid (e.g., colored non-polar liquid 105) may be displaced to one side of the cell to thereby allow light to pass through the cell as indicated by the arrow passing through cell 210a and other cells in FIG. 2.

Figure 3:
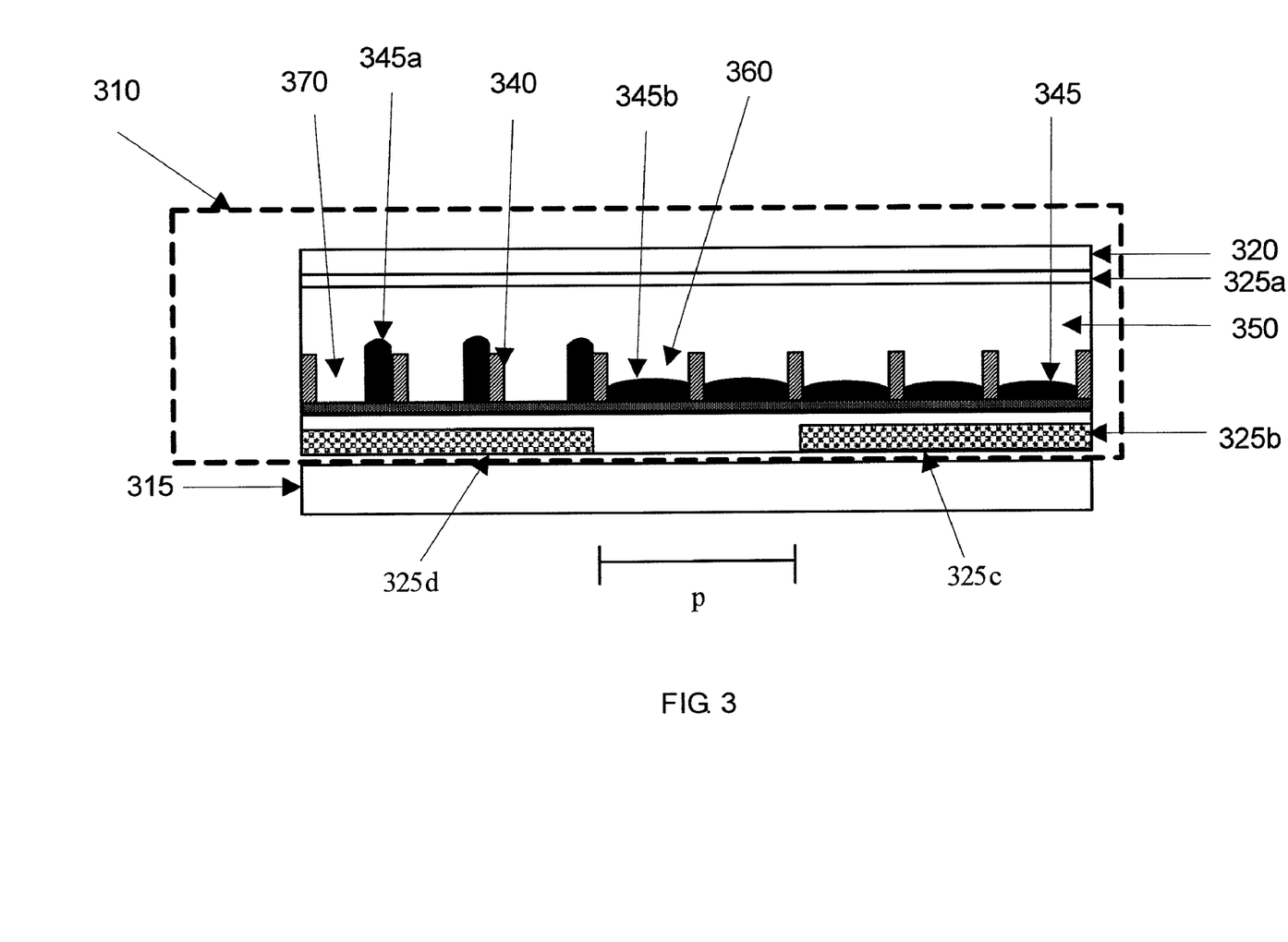
FIG. 3 illustrates an electrowetting light valve unit according to another exemplary embodiment of the present invention.

FIG. 3 illustrates a light valve unit 310 according to one exemplary embodiment of the present invention. The light valve unit 310 comprises a substrate 320. The substrate 320 may have a variety of applications, such as a glass, a polymeric or any other applications known to those skilled in the art. A first conductive layer 325a is coated over the substrate 320 and spaced apart from a second conductive layer 325b. The second conductive layer 325b may be patterned into parallel lines and, in some embodiments may include individual electrodes (e.g., first electrode 325c and second electrode 325d) to which charges may be applied independent of one another. The first conductive layer 325a and the second conductive layer 325b may be made of light transmissive materials, such as indium tin oxide (ITO) or indium zinc oxide (IZO). A plurality of cells (e.g., cell 360 and cell 370) may be formed between the first and the second conductive layers 325a and 325b using a photolithography procedure or other well-known methods. Each two adjacent cells may be separated by a rib (e.g., rib 340) thereby forming a plurality of cells separated by a corresponding plurality of ribs. The rib 340 may or may not extend to the first conductive layer 325a. In this embodiment, the space between the cells, for example, the cell 360, and the first conductive layer 325a is continuous. Each cell may comprise a first material 345 and a second material 350. The first material 345 comprises a non-polar liquid (e.g., similar (at least in terms of function) to the colored non-polar liquid 105 of FIGS. 1A and 1B. Various materials can be employed depending on various applications, such as dodecane, silicone oil and other non-polar solutions well known in the art. The second material 350 may be applied over the first material 345. The second material 350 may flow through out the cells thus forming a continuous phase. The second material 350 may comprise a conductive liquid, such as water, ionic solutions and aqueous surfactants solutions and may be similar (at least in terms of function) to the conductive liquid 104 of FIGS. 1A and 1B.

When there is no electric field applied, the first material 345 may naturally spread over the cells to substantially cover the area between the ribs that define each respective cell. Accordingly, when the first material 345 is spread to substantially cover the area between the ribs a relatively low amount of light is transmitted through the light valve unit 315 at an area corresponding to the cell in which the first material 345 is spread. When a level of voltage is provided between the first and the second conductive layer 325a and 325b (e.g., between the first conductive layer 325a and the second electrode 325d), the second material 350 which is located within an electric field may be subjected to changing. In other words, when the voltage is applied between the first conductive layer 325a and the second electrode 325d, the first material 345 may be displaced by the second material 350 over the area defining the corresponding cell. In this regard, for example, the shape or the contact angle of the second material 350 may be induced which causes a change in the shape of the first material 345 or pushes aside the first material 345. Incident light may thus be transmitted through the light valve unit 315 more easily in cells or areas of cells in which the first material has been displaced by the second material 350 so that the display contrast is changed. As illustrated in FIG. 3, the shape of first material 345a (which corresponds to the first material after deformation by being displaced by the second material 350 responsive to application of a voltage across corresponding electrodes of the respective cell) in cell 370 is changed while first material 345b in cell 360 stays in its natural state (e.g., the state that exists when no voltage is applied across electrodes corresponding to the cell).

Because the second conductive layer 325b is patterned into parallel lines there may be a gap between some electrode lines. For example, in some instances the gap may be provided between each adjacent electrode line such as, for example, between the first and second electrodes 325c and 325d of FIG. 3. In cases where the gap is provided, cells that are adjacent to the gap may not be exposed to an electric field even if both adjacent cells have an electric field applied thereto. Accordingly, the shape or movement of the first material 345 above the gap may not be changed upon the application of an electric field to neighboring cells. For example, because no electric field is applied to the first material 345b above a gap p, the shape of the first material 345b may stay in a constant state. Accordingly, little or no light is transmitted through the first material 345b and luminance of those areas may be close to zero even when an electric field is applied to neighboring cells.

Figure 4:
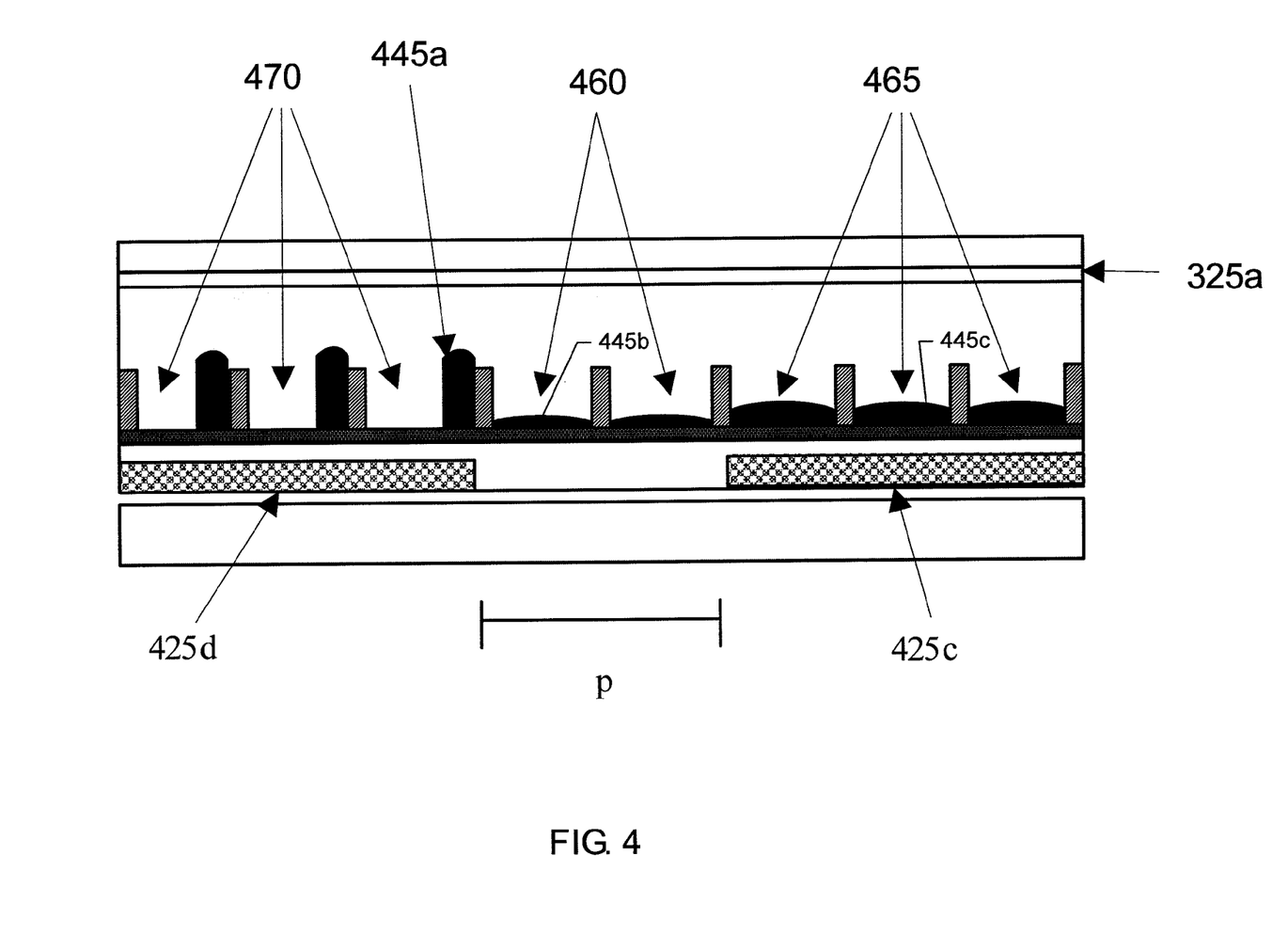
FIG. 4 illustrates an electrowetting light valve unit according to another exemplary embodiment of the present invention.

FIGS. 4-8 illustrate other alternative structures of light valve units according to exemplary embodiments to reduce the sharp contrast that could otherwise occur between adjacent cells. In one exemplary embodiment, as shown in FIG. 4, to let more light pass through cells associated with gaps than that which passes through a cell with no voltage applied thereto, the amount of first material deposited in those cells associated with gaps may be less than the amount of first material deposited in other cells. For example, the amount of first material 445b in cells corresponding to the gap p (e.g., cells 460) is less than the amount of first material 445a and 445c deposited in cells (e.g., cells 465 and 470) adjacent to electrodes (e.g., first electrode 425c and second electrode 425d). Thus, for example, when a voltage is provided between the first conductive layer 325a and the second electrode 425d, the shape or the movement of the first material 445a in cells 470 will be subject to deformation (e.g., changing) or will be pushed aside as shown in FIG. 4 so that light may pass through the cells 470. Since cells 465 are not within the electric field, the state of the first material 445c in cells 465 will not be changed. Thus, light will be substantially blocked due to the OFF state of the first material 445c. As the amount of the first material 445b deposited in the cells 460 is less than the amount of the first material 445c of the cells 465, relatively more light passes through the cells 460 than the amount of light passing through cells 465, but less light passes through the cells 460 than the amount of light passing through the cells 470. Accordingly, luminance of areas under electric field as compared to luminance of areas without application of an electric field changes gradually.

Figure 5:
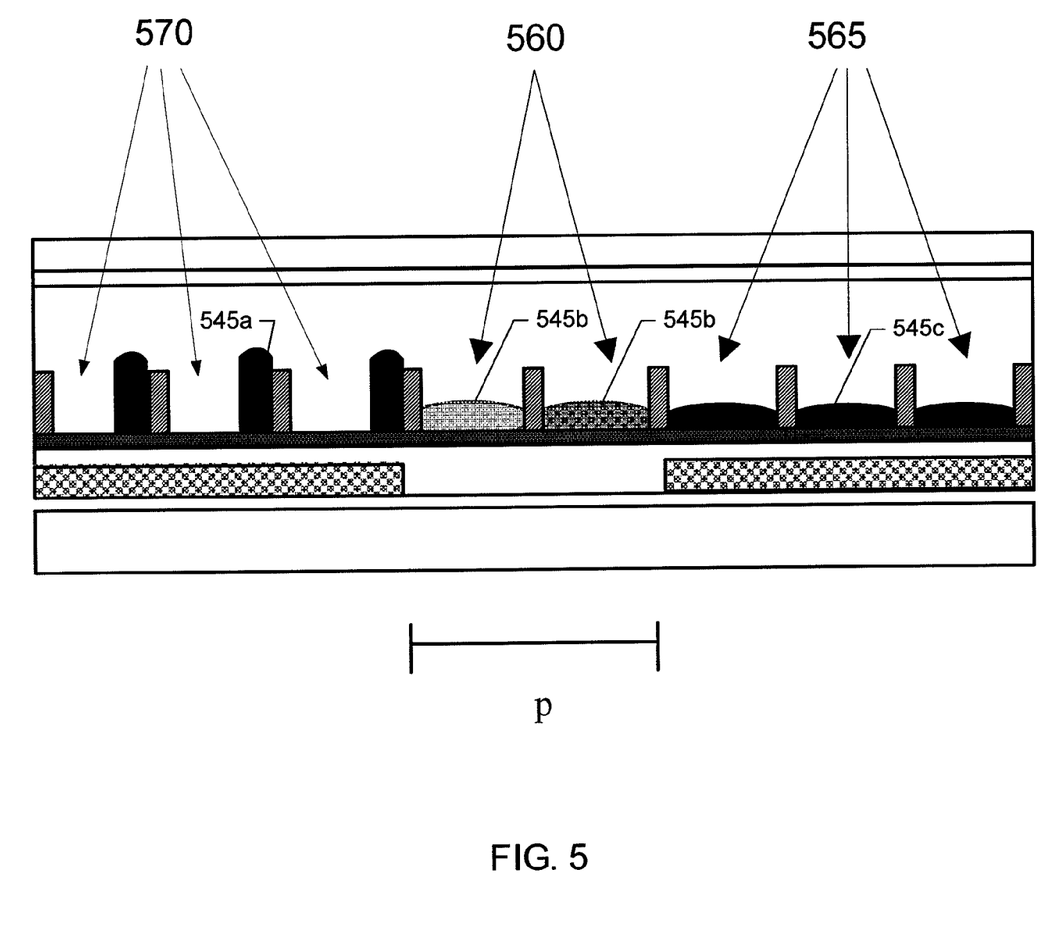
FIG. 5 illustrates an electrowetting light valve unit according to another exemplary embodiment of the present invention.

In another exemplary embodiment as shown in FIG. 5, first material deposited in cells associated with gaps (e.g., cells immediately adjacent to a gap) may comprise dye or pigment of a different density than cells disposed between electrodes. For example, cells 560 are associated with the gap p and thus, first material 545b associated with the cells 560 may comprise less dye or pigment than of first material 545a of cells 570 and first material 545c of cells 565. Thus, more light may transmit through the cells 560 than the cells 565 to which no electric field is applied, although more light may transmit through the cells 570 than through the cells 560 with an electric field applied to the cells 570.

Figure 6:
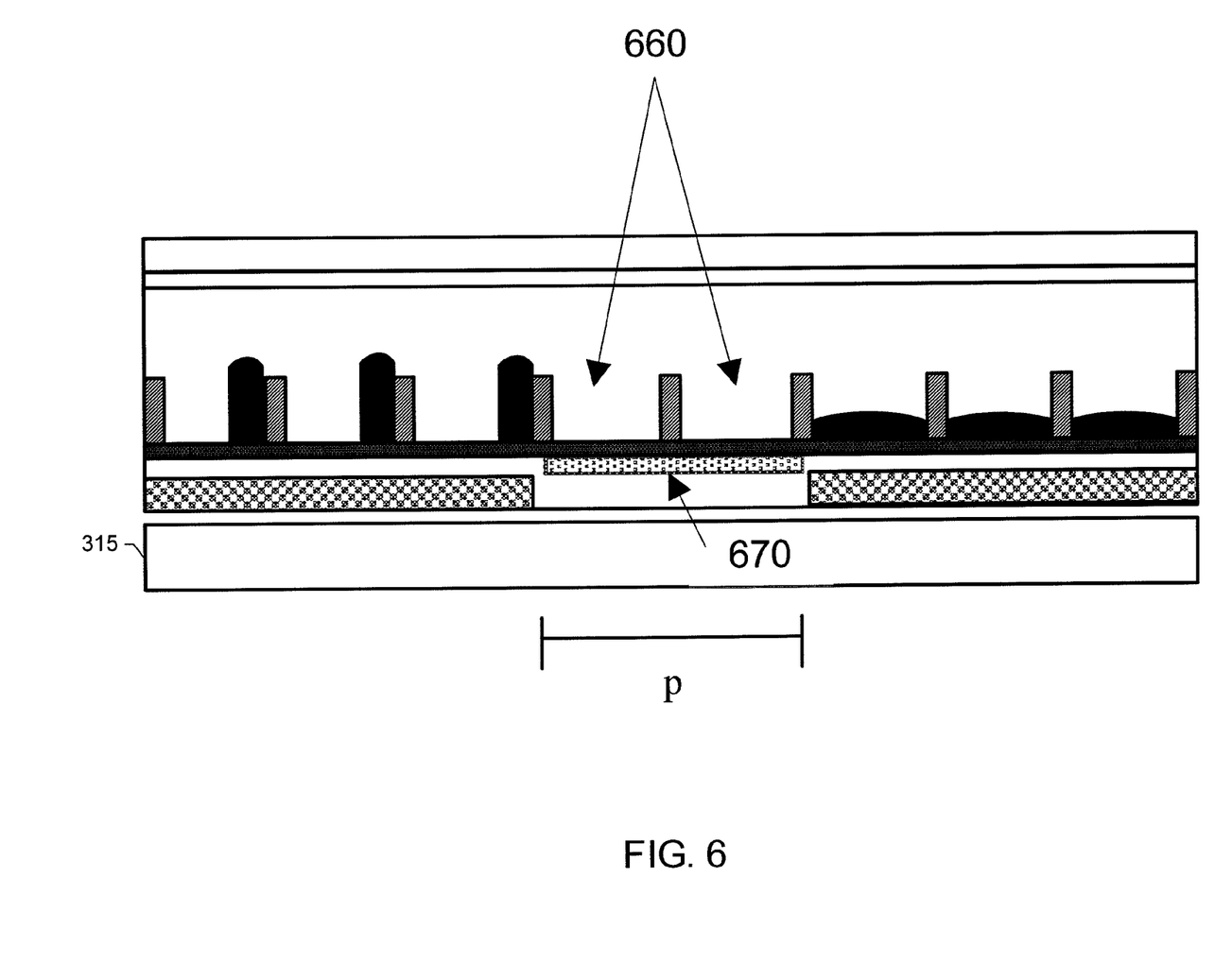
FIG. 6 illustrates an electrowetting light valve unit according to another exemplary embodiment of the present invention.

In another exemplary embodiment as illustrated in FIG. 6, first material may not be deposited in cells associated with gaps. Thus, for example, cells associated with the gap p, such as cells 660, may not include any first material disposed between ribs associated with the gap p (e.g., cells 660). In such an instance, incident light provided by the backlight unit 315 may directly pass through the cells 660. In some cases, in order to partially block light passing through those cells for which no first material is provided to dim the brightness, a padding 670 may be attached to the cells 660. As a result, light transmitted through the cells 660 may be reduced as compared to the light transmitted through the cells 660 in cases where no padding 670 is included.

Figure 7:
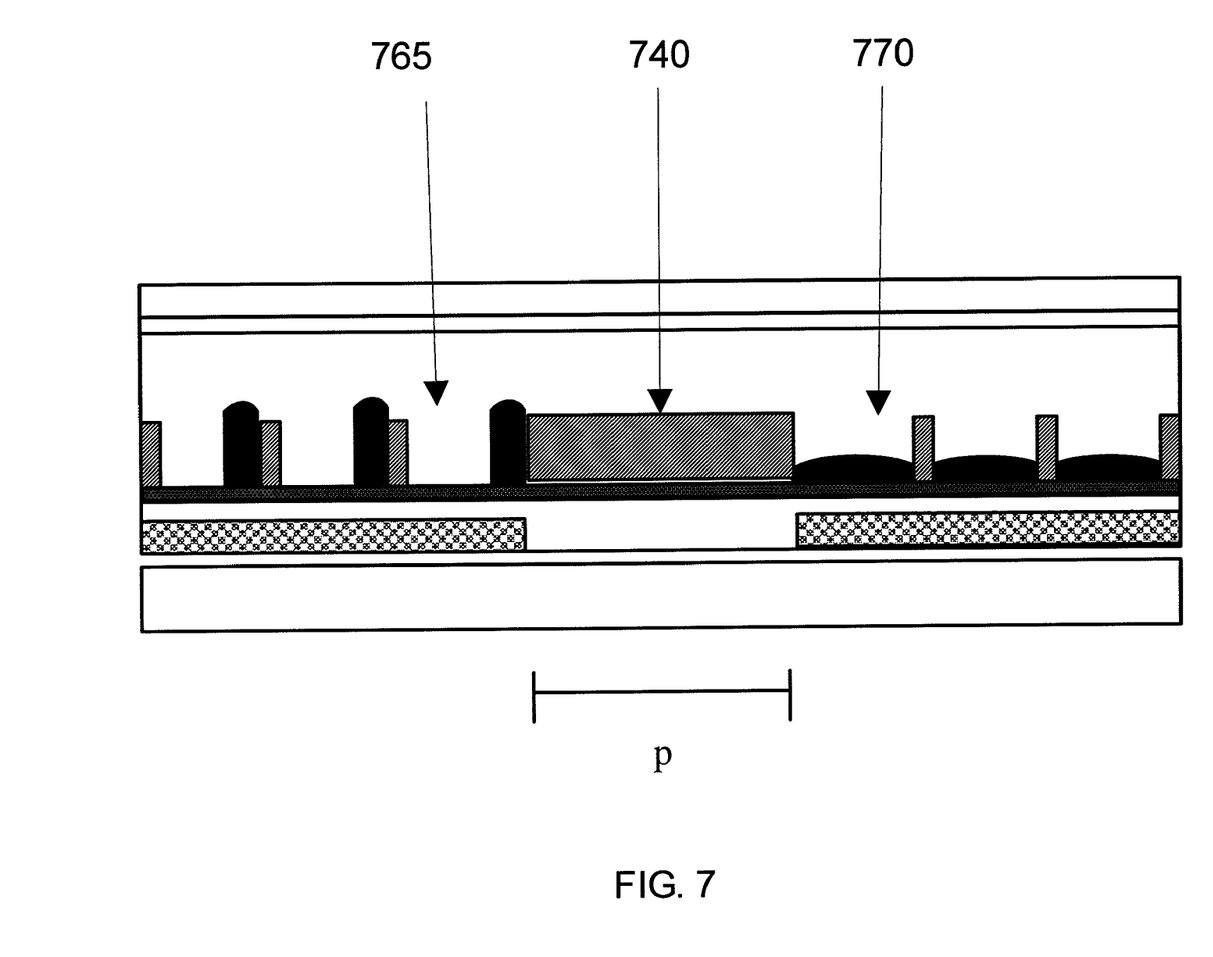
FIG. 7 illustrates an electrowetting light valve unit according to yet another exemplary embodiment of the present invention.

In another exemplary embodiment as illustrated in FIG. 7, no first material may be deposited in an area associated with gaps. In fact, as shown in FIG. 7, no cells may be provided in areas adjacent to gaps. Instead, to partially block light to passing through regions associated with gaps, ribs to separate those cells on either side of the corresponding gaps may extend to form a uniform rib. In other words, adjacent cells on either side of a gap may share a single rib therebetween in which the single rib is of substantially equal length to the length of the gap. For example, ribs between adjacent two cells 765 and 770 may extend to form a uniform rib 740. Consequently, since the material of ribs may be chosen to be partially transmissive, light may partially transmit through the uniform rib 740 regardless of the electric field applied to cells adjacent to the uniform rib 740. Thus, for example, the amount of light passing through the uniform rib 740 may be less than the amount of light passing through cells 765 with an electric field applied thereto, but more than the amount of light passing through cells 770 without an electric field applied thereto. Accordingly, the contrast between areas associated with cells 765 and 770, respectively, may be mitigated.

Figure 8:
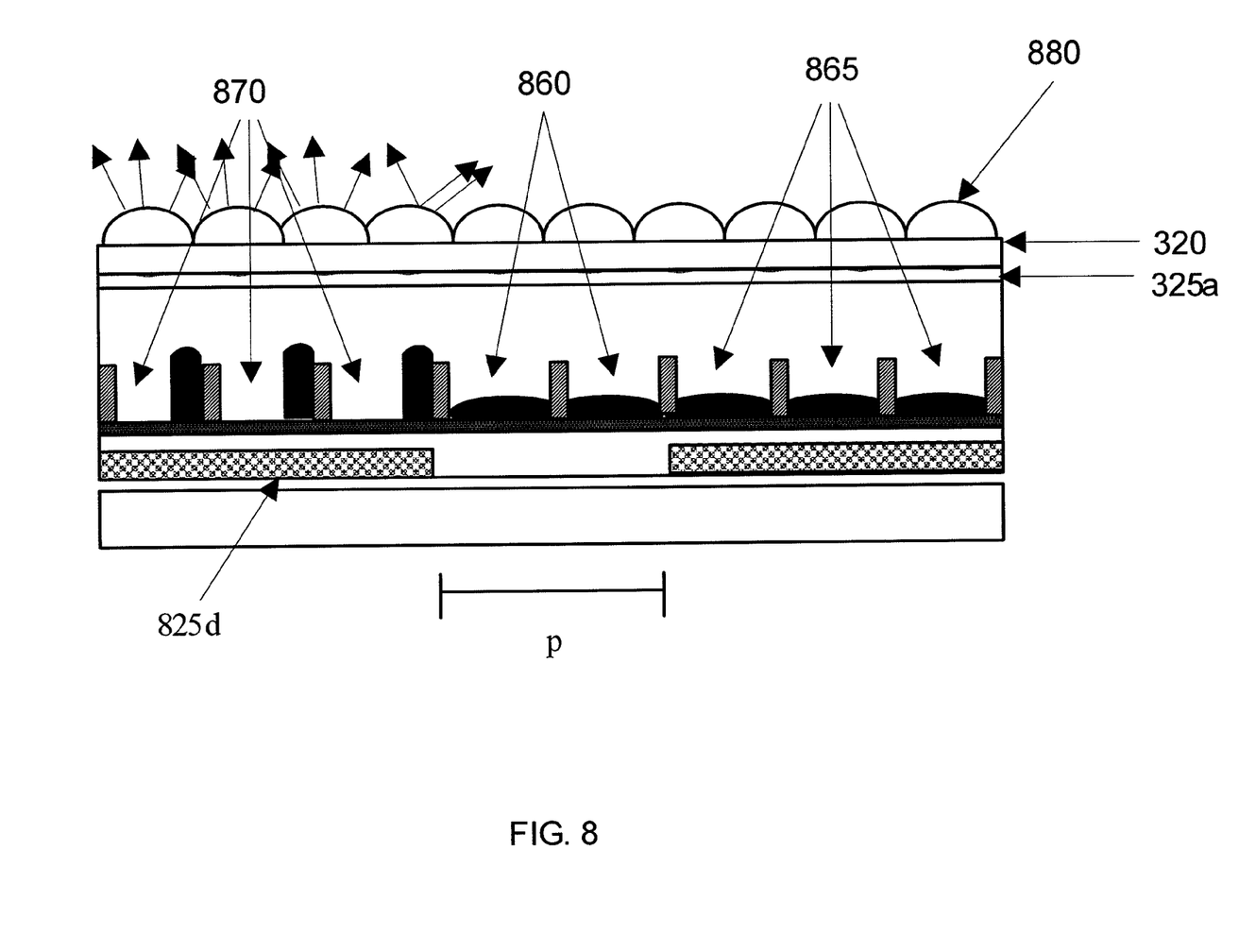
FIG. 8 illustrates an electrowetting light valve unit according to still another exemplary embodiment of the present invention.

In another exemplary embodiment as shown in FIG. 8, a voltage is provided between the first conductive layer 325a and electrode 825d of the second conductive layer with the result that cells 870 are located within a suitable electric field. The electric field provided between the first conductive layer 325a and the electrode 825d may cause deformation of first material 845a to allow light to more easily pass through the cells 870. Because no electric field is applied to cells 860 and 865, the state of the first material in those cells (i.e., first material 845b and first material 845c, respectively) will not be changed. Accordingly little or no light will be transmitted through the cells 860 and 865 and thus luminance of areas above the cells 860 and 865 may be at a relatively low level. To obtain a more gradual change of brightness between cells associated with corresponding electrodes (e.g., from cells 870 to cells 865) and not associated with the gap p, an additional lens 880 (or a plurality of lenses forming a lens film or lens layer) may be attached to top of the substrate 320. Since light passes through the cells 870 will be deflected in various directions by the lens 880 including to nearby regions of the lens 880, areas above gap p will receive some deflected light. In this regard, the amount of deflected light perceived to be coming from an area of the lens 880 corresponding to the gap p will be proportional to the distance from the area of the lens 880 corresponding to cells 870 thereby providing a gradual decrease in the amount of light perceived to be coming from the lens 880 from the region corresponding to the cells 870 to the region corresponding to the cells 865. As a result, the contrast between the area above the cells 870 and 865 is mitigated.

Accordingly, in various exemplary embodiments of the present invention, a display device may be provided with a display panel and a light valve unit including a first conductive layer and a second conductive layer disposed on opposite sides of each other with respect to a plurality of cells. Each of the plurality of cells may include a first material and a second material in which a position of the first material within each cell is changeable responsive to application of an electric field being applied between the first and second conductive layers to thereby alter transmission of light through each respective cell across which the electric field is applied. The light valve unit may further provide that the second conductive layer includes at least two electrodes and a gap between each of the two electrodes. Portions of the light valve unit adjacent to the gap may have a transmissivity that is less than portions of the light valve unit adjacent to cells across which the electric field is applied, but greater than or equal to portions of the light valve unit adjacent to cells across which the electric field is not applied to mitigate contrast between adjacent cells with different states with respect to the application of the electric field.

Numerous ways of providing the mitigation may be provided such as, for example, by providing different amounts of the first material in cells adjacent to the gap, providing first materials with lower dye or pigment density in cells adjacent to the gap, providing a uniform rib extending substantially over an entirety of the gap, providing no first material in cells adjacent to the gap (with or without padding), or providing a lens to scatter light through portions of the lens that correspond to cells adjacent to the gap.

Figure 9:
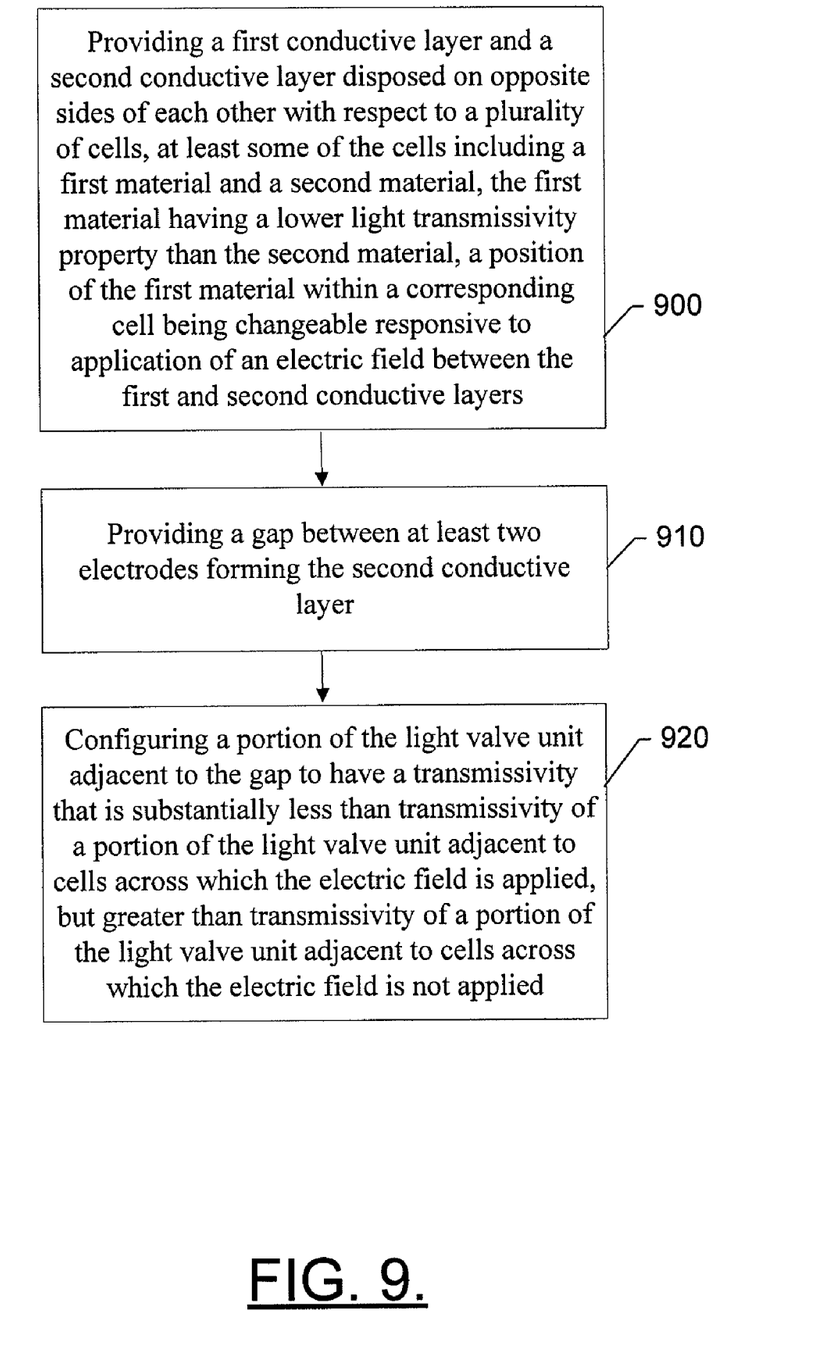
FIG. 9 illustrates a method of manufacturing an electrowetting light valve unit according to one exemplary embodiment of the present invention.

A method for providing a display device (or a light valve unit for use in such a display) is provided in FIG. 9. The method may include providing a first conductive layer and a second conductive layer disposed on opposite sides of each other with respect to a plurality of cells of a light valve unit in which at least some of the cells include a first material and a second material at operation 900. The first material may have a lower light transmissivity property than the second material and a position of the first material within a corresponding cell may be changeable responsive to application of an electric field between the first and second conductive layers. The method may further include providing a gap between at least two electrodes forming the second conductive layer at operation 910 and configuring a portion of the light valve unit adjacent to the gap to have a transmissivity that is substantially less than transmissivity of a portion of the light valve unit adjacent to cells across which the electric field is applied, but greater than or equal to transmissivity of a portion of the light valve unit adjacent to cells across which the electric field is not applied at operation 920.

In some embodiments, configuring the portion of the light valve unit adjacent to the gap may include providing, in the portion of the light valve unit adjacent to the gap, a first material having a different dye/pigment density than a dye/pigment density of the first material in cells adjacent to the two electrodes. Alternatively, configuring the portion of the light valve unit adjacent to the gap may include providing the portion of the light valve unit adjacent to the gap with a lower amount of the first material than the amount of the first material in cells adjacent to the two electrodes or providing the portion of the light valve unit adjacent to the gap with no first material and with padding having transmissivity that is substantially less than transmissivity of the portion of the light valve unit adjacent to cells across which the electric field is applied, but greater than transmissivity of the portion of the light valve unit adjacent to cells across which the electric field is not applied. In some cases, the method may further include separating each cell of the light valve unit from each adjacent cell with a rib and configuring the portion of the light valve unit adjacent to the gap with a uniform rib substantially equal in length to a length of the gap and having a length longer than ribs not corresponding to the portion of the light valve unit adjacent to the gap. In one embodiment, configuring the portion of the light valve unit adjacent to the gap may include providing the light valve unit with a lens configured to scatter light through portions of the lens that correspond to cells adjacent to the gap in response to light passing through the portion of the light valve unit adjacent to cells across which the electric field is applied.

What is claimed is:

1. A light valve unit comprising:
   a first conductive layer and a second conductive layer disposed on opposite sides of each other with respect to a plurality of cells disposed therebetween, at least some of the cells including a first material and a second material, the first material having a lower light transmissivity property than the second material, a position of the first material within a corresponding cell being changeable responsive to application of an electric field between the first and second conductive layers,
   wherein the second conductive layer includes at least two electrodes and a gap defined between the two electrodes, and
   wherein a portion of the light valve unit adjacent to the gap and not overlapping with cells adjacent to either of the two electrodes is configured to have a transmissivity that is substantially less than transmissivity of a portion of the light valve unit adjacent to cells across which the electric field is applied, but greater than or equal to transmissivity of a portion of the light valve unit adjacent to cells across which the electric field is not applied.

2. The light valve unit of claim 1, wherein the portion of the light valve unit adjacent to the gap comprises a first material having a different dye or pigment density than a dye or pigment density of the first material in cells adjacent to the electrodes.

3. The light valve unit of claim 1, wherein the portion of the light valve unit adjacent to the gap comprises a first material having a lower dye or pigment density than the first material in cells adjacent to either of the electrodes.

4. The light valve unit of claim 1, wherein the portion of the light valve unit adjacent to the gap comprises a lower amount of the first material than the amount of the first material in cells adjacent to the electrodes.

5. The light valve unit of claim 1, wherein each cell of the light valve unit is separated from each adjacent cell by a rib and the portion of the light valve unit adjacent to the gap comprises a uniform rib substantially equal in length to a length of the gap and having a length longer than ribs not corresponding to the portion of the light valve unit adjacent to the gap.

6. The light valve unit of claim 1, wherein the portion of the light valve unit adjacent to the gap is devoid of the first material.

7. The light valve unit of claim 1, wherein the portion of the light valve unit adjacent to the gap is devoid of the first material and comprises padding having transmissivity that is substantially less than transmissivity of the portion of the light valve unit adjacent to cells across which the electric field is applied, but greater than transmissivity of the portion of the light valve unit adjacent to cells across which the electric field is not applied.

8. The light valve unit of claim 1, wherein the light valve unit further includes a lens configured to scatter light through portions of the lens that correspond to cells adjacent to the gap in response to light passing through the portion of the light valve unit adjacent to cells across which the electric field is applied.

9. A display device comprising:
   a display panel; and
   a light valve unit in operable communication with the display panel, the light valve unit including:
   a first conductive layer and a second conductive layer disposed on opposite sides of each other with respect to a plurality of cells disposed therebetween, at least some of the cells including a first material and a second material, the first material having a lower light transmissivity property than the second material, a position of the first material within a corresponding cell being changeable responsive to application of an electric field between the first and second conductive layers,
   wherein the second conductive layer includes at least two electrodes and a gap defined between the two electrodes, and
   wherein a portion of the light valve unit adjacent to the gap and not overlapping with cells adjacent to either of the two electrodes is configured to have a transmissivity that is substantially less than transmissivity of a portion of the light valve unit adjacent to cells across which the electric field is applied, but greater than or equal to transmissivity of a portion of the light valve unit adjacent to cells across which the electric field is not applied.

10. The display device of claim 9, wherein the portion of the light valve unit adjacent to the gap comprises a first material having a different dye or pigment density than a dye or pigment density of the first material in cells adjacent to the electrodes.

11. The display device of claim 9, wherein the portion of the light valve unit adjacent to the gap comprises a lower amount of the first material than the amount of the first material in cells adjacent to the electrodes.

12. The display device of claim 9, wherein each cell of the light valve unit is separated from each adjacent cell by a rib and the portion of the light valve unit adjacent to the gap comprises a uniform rib substantially equal in length to a length of the gap and having a length longer than ribs not corresponding to the portion of the light valve unit adjacent to the gap.

13. The display device of claim 9, wherein the portion of the light valve unit adjacent to the gap is devoid of first material and comprises padding having transmissivity that is substantially less than transmissivity of the portion of the light valve unit adjacent to cells across which the electric field is applied, but greater than transmissivity of the portion of the light valve unit adjacent to cells across which the electric field is not applied.

14. The display device of claim 9, wherein the light valve unit further includes a lens configured to scatter light through portions of the lens that correspond to cells adjacent to the gap in response to light passing through the portion of the light valve unit adjacent to cells across which the electric field is applied.

15. A method for forming a light valve unit comprising:
providing a first conductive layer and a second conductive layer disposed on opposite sides of each other with respect to a plurality of cells disposed therebetween, at least some of the cells including a first material and a second material, the first material having a lower light transmissivity property than the second material, a position of the first material within a corresponding cell being changeable responsive to application of an electric field between the first and second conductive layers;
providing a gap between at least two electrodes forming the second conductive layer; and
configuring a portion of the light valve unit adjacent to the gap and not overlapping with cells adjacent to either of the two electrodes to have a transmissivity that is substantially less than transmissivity of a portion of the light valve unit adjacent to cells across which the electric field is applied, but greater than or equal to transmissivity of a portion of the light valve unit adjacent to cells across which the electric field is not applied.

16. The method of claim 15, wherein configuring the portion of the light valve unit adjacent to the gap comprises providing, in the portion of the light valve unit adjacent to the gap, a first material having a different dye or pigment density than a dye or pigment density of the first material in cells adjacent to the electrodes.

17. The method of claim 15, configuring the portion of the light valve unit adjacent to the gap comprises providing the portion of the light valve unit adjacent to the gap with a lower amount of the first material than the amount of the first material in cells adjacent to the electrodes.

18. The method of claim 15, further comprising separating each cell of the light valve unit from each adjacent cell with a rib and wherein configuring the portion of the light valve unit adjacent to the gap comprises providing the portion of the light valve unit adjacent to the gap with a uniform rib substantially equal in length to a length of the gap and having a length longer than ribs not corresponding to the portion of the light valve unit adjacent to the gap.

19. The method of claim 15, wherein configuring the portion of the light valve unit adjacent to the gap comprises providing the portion of the light valve unit adjacent to the gap devoid of first material and with padding having transmissivity that is substantially less than transmissivity of the portion of the light valve unit adjacent to cells across which the electric field is applied, but greater than transmissivity of the portion of the light valve unit adjacent to cells across which the electric field is not applied.

20. The method of claim 15, wherein configuring the portion of the light valve unit adjacent to the gap comprises providing the light valve unit with a lens configured to scatter light through portions of the lens that correspond to cells adjacent to the gap in response to light passing through the portion of the light valve unit adjacent to cells across which the electric field is applied.

* * * * *